United States Patent
Koyama (10) Patent No.: US 9,956,660 B2
(45) Date of Patent: May 1, 2018

(54) CONTROLLER FOR A MACHINE TOOL TO PERFORM EFFICIENT WARM-UP CONTROL

(71) Applicant: FANUC Corporation, Yamanashi (JP)

(72) Inventor: Yasuaki Koyama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 279 days.

(21) Appl. No.: 14/755,907

(22) Filed: Jun. 30, 2015

(65) Prior Publication Data
US 2016/0001410 A1    Jan. 7, 2016

(30) Foreign Application Priority Data
Jul. 3, 2014 (JP) .................. 2014-137969

(51) Int. Cl.
| | |
|---|---|
| B23Q 11/14 | (2006.01) |
| B23Q 11/00 | (2006.01) |
| B23Q 15/12 | (2006.01) |
| B23Q 15/18 | (2006.01) |
| G05B 19/404 | (2006.01) |

(52) U.S. Cl.
CPC .......... *B23Q 11/14* (2013.01); *B23Q 11/0007* (2013.01); *B23Q 15/12* (2013.01); *B23Q 15/18* (2013.01); *G05B 19/404* (2013.01); *G05B 2219/37428* (2013.01); *G05B 2219/37429* (2013.01); *G05B 2219/49204* (2013.01); *G05B 2219/49213* (2013.01)

(58) Field of Classification Search
USPC .................................................. 700/22, 170
See application file for complete search history.

(56) References Cited

U.S. PATENT DOCUMENTS

| | | |
|---|---|---|
| 2003/0065419 A1 | 4/2003 | Fujishima et al. |
| 2013/0211598 A1 | 8/2013 | Fujii |

FOREIGN PATENT DOCUMENTS

| | | | |
|---|---|---|---|
| JP | 4-240045 A | 8/1992 | |
| JP | H07-124846 A | 5/1995 | |
| JP | H08-215981 A | 8/1996 | |
| JP | 2001-138178 A | 5/2001 | |
| JP | 2002-018677 A | 1/2002 | |
| JP | 2002018677 A * | 1/2002 | ........... G05B 19/404 |
| JP | 2003-108206 A | 4/2003 | |
| JP | 2004-261934 A | 9/2004 | |
| JP | 2005-34929 A | 2/2005 | |
| JP | 2005034929 A * | 2/2005 | |

(Continued)

OTHER PUBLICATIONS

Office Action in JP Application No. 2014-137969, dated Feb. 28, 2017.

*Primary Examiner* — Emilio J Saavedra
(74) *Attorney, Agent, or Firm* — Hauptman Ham, LLP (57) ABSTRACT

A thermal displacement state (target thermal displacement state) in which thermal displacement of a machine tool is saturated when the machine tool is operated based on a machining program is previously stored, and a warm-up operation pattern of a motor is determined so as to approach the target thermal displacement state. The motor is driven based on the warm-up operation pattern and the warm-up operation of the motor is stopped if the thermal displacement state of the machine tool is within a predetermined range.

4 Claims, 6 Drawing Sheets

(56) References Cited

FOREIGN PATENT DOCUMENTS

| | | | | |
|---|---|---|---|---|
| JP | 2006-65716 A | | 3/2006 | |
| JP | 2006065716 A | * | 3/2006 | |
| JP | 2010-234500 A | | 10/2010 | |
| JP | 2013-163255 A | | 8/2013 | |
| JP | 2013163255 A | * | 8/2013 | ........... G05B 19/404 |

* cited by examiner

```
%
O0001
#100 = 30 / f(CONTINUOUS ROTATION TIME OF SPINDLE)
#101 = 0

N100
WHEN #100 IS 0
M3 SRs
WHEN #101 IS 1
M5
REVERSE 0 AND 1 OF #101 WHEN #100 IS EXCEEDED BY
ELAPSED TIME
GOTO100
%
```

CONTROLLER FOR A MACHINE TOOL TO PERFORM EFFICIENT WARM-UP CONTROL

RELATED APPLICATIONS

The present application claims priority to Japanese Application Number 2014-137969, filed Jul. 3, 2014, the disclosure of which is hereby incorporated by reference herein in its entirety.

BACKGROUND OF THE INVENTION

Field of the Invention

The present invention relates to a controller for a machine tool, and more particularly, to a controller for a machine tool configured to perform efficient warm-up control based on a thermal displacement state at the point in time when thermal displacement is saturated.

Description of the Related Art

In a machine tool, a feed screw and a spindle are driven by a motor, so that they are expanded to inevitably change the machine position by heating of the motor, frictional heat due to rotation of a bearing, and frictional heat from a contact portion between a ball screw and a ball nut. Thus, the relative positions of a tool and a workpiece to be machined are shifted. This change of the machine position due to the heating causes a problem in high-precision machining.

The displacement of the machine position by heat can be removed by using the following methods. One of these methods is a technique in which a command position is compensated based on a detected displacement or temperature measured by a displacement or temperature sensor (thermal displacement compensation). In another method, initial tension is applied to a feed screw to avoid the influence of thermal expansion. A third method is a warm-up method in which a machine is operated to stabilize accuracy before machining a workpiece.

In warm-up operation, the spindle is rotated at a speed used for actual workpiece machining or idling is repeated to run a machining program without a workpiece mounted in the machine. The machining accuracy can be stabilized by performing idling until the thermal displacement of the machine tool is stabilized. However, the time and details of the idling are determined based on the experience and intuition of a skilled operator, so that wasteful warm-up time may possibly occur. To overcome this, a method for determining the timing for ending warm-up operation and a method for efficiently performing warm-up operation are proposed in, for example, Japanese Patent Applications Laid-Open Nos. 07-124846, 2004-261934, and 08-215981.

A machine tool described in Japanese Patent Application Laid-Open No. 07-124846 is constructed based on the observation that the motion of a hydraulic actuator is less smooth than usual in the first morning operation and inevitably fails to pass various abnormality tests during warm-up operation. When a warm-up mode is selected in this machine tool, the position tolerance of a hydraulic servo system and the set value of position arrival time are increased so that some predetermined operations can be omitted by ignoring detection signals from a workpiece detection switch. Thus, the machine tool can smoothly perform warm-up operation without a useless interruption of operation.

Although the warm-up time is reduced by obviating a useless operation stop according to the technique described above, however, a machining program for idling is one designed for use in actual machining. Therefore, the warm-up operation involves many wasteful operations, such as a dwelling operation commanded during machining, low-speed machining operation, and tool change operation, and entails extra time for that.

A machine tool described in Japanese Patent Application Laid-Open No. 2004-261934 can reduce the warm-up time by such control as to prevent wasteful warm-up operation. In this control, the cutting-edge position of a tool is detected during warm-up operation of a spindle, and it is determined that there is no need of warm-up operation if the change of the tool cutting-edge position is within a preset tolerance.

Although the timing for ending the warm-up operation can be determined according to the technique described above, the reduction of the warm-up time is limited, since the efficiency of the warm-up operation is invariable. Further, the object to be the warmed up is limited to the spindle, and there is no description of warm-up operation of a feed screw in the patent document.

A machine tool described in Japanese Patent Application Laid-Open No. 08-215981 can reduce the warm-up time in the following manner. A spindle is rotated at a speed used for actual machining and a thermal displacement amount at the time of saturation of thermal displacement is measured in advance. In actual warm-up operation, the spindle is rotated at a higher speed for preheating so that a thermal displacement amount equal to the measured value is reached. Thereafter, the rotational speed for the actual machining is restored, and machining is started with relative positions compensated by an amount corresponding to the generated thermal displacement amount. In this way, a high machining accuracy equivalent to that for the case where the stability of the thermal displacement is awaited before starting the machining can be obtained, and at the same time, the warm-up time can be reduced.

According to the technique described above, the timing for ending the warm-up operation is determined by comparing a thermal displacement amount in a case where the thermal displacement is saturated with a current thermal displacement amount. Since a thermal displacement amount of a spindle involves deformations of a spindle mount and a column and the thermal displacement does not simply increase but complicatedly changes, however, the warm-up operation may sometimes be ended in an untimely manner. Further, the above patent document describes only the warm-up operation at a certain rotational speed for preheating and does not describe efficient warm-up operation taking into consideration acceleration and deceleration of the spindle. Furthermore, the object to be warmed up is limited to the spindle, and there is no description of warm-up operation of a feed screw in that patent document.

SUMMARY OF THE INVENTION

Accordingly, an object of the present invention is to provide a controller for a machine tool, capable of performing warm-up operation without entailing wasteful operation so that the warm-up time is reduced.

A controller for a machine tool according to the present invention drives a motor based on a machining program, thereby driving a spindle and a feed screw. The controller includes: a storage unit that stores therein, as a target thermal displacement state, a thermal displacement state in which thermal displacement of the machine tool is saturated when the machine tool is operated in advance based on the machining program; a warm-up operation determination unit configured to determine a warm-up operation pattern of the motor so as to approach the target thermal displacement state; a thermal displacement state calculation unit configured to calculate the thermal displacement state of the machine tool; a motor drive unit configured to drive the motor according to the warm-up operation pattern determined by the warm-up operation determination unit; and a motor stop unit configured to calculate the thermal displacement state of the machine tool for each predetermined period by means of the thermal displacement state calculation unit, compare the calculated thermal displacement state with the target thermal displacement state, and stop the motor drive unit if the difference between the calculated thermal displacement state and the target thermal displacement state is within a predetermined threshold value.

The thermal displacement state calculation unit may include a temperature distribution estimation unit configured to grasp a spindle portion as a model divided into a plurality of sections and estimate the respective temperatures of the individual sections, and a spindle thermal displacement amount estimation unit configured to estimate a thermal displacement amount by the temperature distribution estimation unit. The warm-up operation determination unit may determine the warm-up operation pattern for driving the spindle based on the estimated values of the temperature distribution estimation unit. And the motor stop unit may be configured to stop the motor drive unit if the difference between the temperature calculated by the temperature distribution estimation unit and a temperature in the target thermal displacement state is within a predetermined threshold value.

The thermal displacement state calculation unit may include a heating portion estimation unit configured to estimate thermal displacement amounts for a plurality of sections obtained by dividing the feed screw, and a feed screw thermal displacement amount estimation unit configured to estimate a thermal displacement amount for the entire feed screw by adding up the estimated thermal displacement amounts. The warm-up operation determination unit may determine the warm-up operation pattern for driving the feed screw based on the estimated values of the heating portion estimation unit, and the motor stop unit may be configured to stop the motor drive unit if the difference between the thermal displacement amount for the feed screw calculated by the feed screw thermal displacement amount estimation unit and a feed screw thermal displacement amount in the target thermal displacement state is within a predetermined threshold value.

The controller may calculate the thermal displacement amount by means of the thermal displacement state calculation unit even after the motor drive unit is stopped and resumes the drive of the motor by the motor drive unit if the calculated thermal displacement state does not agree with the target thermal displacement state.

According to the present invention configured as described above, the feed screw and the spindle are driven so as to agree with the thermal displacement state at the time of saturation of the thermal displacement, whereby warm-up operation can be achieved without entailing wasteful operation and the warm-up time can be reduced. The spindle is intermittently accelerated and decelerated at a rotational speed not lower than that for actual workpiece machining, while the feed screw is reciprocated in a certain section so as to be partially heated. In this way, the warm-up operation can be performed efficiently.

Moreover, the timing for ending the warm-up operation is determined based on comparison between the thermal displacement state at the time of saturation of the thermal displacement and the current thermal displacement state. Thus, wasteful warm-up time can be obviated so that the warm-up time can be further reduced.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
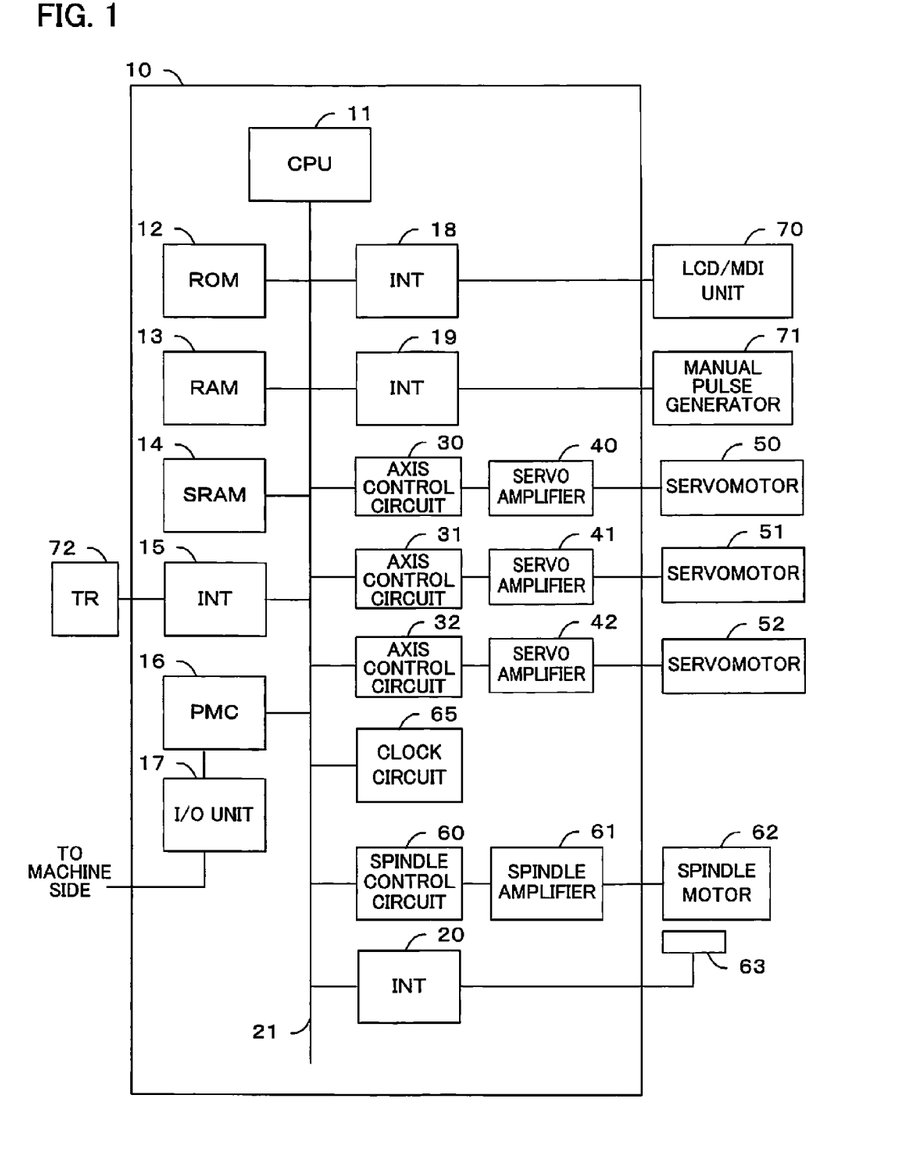
FIG. 1 is a block diagram showing a controller for a machine tool according to the present invention.

A controller for a machine tool according to the present invention will be described with reference to the block diagram of FIG. 1 showing a numerical controller.

A numerical controller 10 for controlling a machine tool constitutes a thermal displacement compensation device (described later) for the machine tool. A processor (CPU) 11 of the numerical controller 10 reads a system program stored in a ROM 12 through a bus 21 and generally controls the numerical controller 10 according to the read system program. A RAM 13 is loaded with temporary calculation data, display data, various data input by an operator through an LCD/MDI unit (manual data input device with a liquid crystal display) 70, and the like.

An SRAM 14 is constructed as a nonvolatile memory, which is backed up by a battery (not shown) so that it can maintain its storage state even after the numerical controller 10 is powered off. The SRAM 14 is stored with a program for the measurement of an initial position, a program for thermal displacement compensation of the machine tool, a machining program (described later) read through an interface 15, a machining program input through the LCD/MDI unit 70, and the like. Further, the ROM 12 is preloaded with various system programs for the execution of edit-mode processing required for the creation and editing of the machining programs and processing for automatic operation.

The interface 15 is an interface for external equipment that can be connected to the numerical controller 10, to which an external device 72 such as an external storage device is connected. The machining programs, thermal displacement measurement program, and the like are read from the external storage device. A programmable machine controller (PMC) 16 controls auxiliary devices and the like on the machine-tool side by means of sequential programs in the numerical controller 10. Necessary signals on the auxiliary-device side are converted according to these sequential programs, based on M-, S- and T-functions commanded by the machining programs. The converted signals are output to the auxiliary-device side through an input-output unit 17. The auxiliary devices, e.g., various actuators, are activated by these output signals. When signals are received from various switches of a control panel on the body of the machine tool, moreover, they are processed as required and delivered to the processor 11.

Image signals indicative of current positions of the axes of the machine tool, alarms, parameters, image data, and the like are delivered to the LCD/MDI unit 70 and displayed on its display. The LCD/MDI unit 70 is a manual data input device including the display, a keyboard, and the like. An interface 18 receives data from the keyboard of the LCD/MDI unit 70 and delivers it to the processor 11.

An interface 19 is connected to a manual pulse generator 71. The manual pulse generator 71 is mounted on the control panel of the machine tool and used to precisely position movable parts of the machine tool by individual-axis control with distributed pulses based on manual operation. X- and Y-axis control circuits 30 and 31 for moving a table T of the machine tool and a Z-axis control circuit 32 receive axis movement commands from the processor 11 and output the commands for the individual axes to servo amplifiers 40 to 42. On receiving these commands, the servo amplifiers 40 to 42 drive servomotors 50 to 52 for the individual axes of the machine tool, respectively. Position detectors for position detection are incorporated in the servomotors 50 to 52, individually. Position signals from these position detectors are fed back as pulse trains.

A spindle control circuit 60 receives a spindle rotation command for the machine tool and outputs a spindle rotating speed signal to a spindle amplifier 61. On receiving this spindle speed signal, the spindle amplifier 61 rotates a spindle motor 62 of the machine tool at a commanded rotational speed, thereby driving a tool. A position detector 63 is coupled to the spindle motor 62 by gears, a belt, or the like. The position detector 63 outputs feedback pulses in synchronization with the rotation of a spindle, and the feedback pulses are read through an interface 20 by the processor 11. Reference numeral 65 denotes a clock device adjusted so as to synchronize with the current time.

The following is a description of steps of processing performed by the numerical controller 10.

<1. Calculation of Thermal Displacement State>

A method of thermal displacement state calculation performed by the numerical controller 10 of FIG. 1 will be described first. A thermal displacement state indicates the thermal displacement amounts, thermal displacement distributions, temperature distributions, and the like of constituent elements of the machine tool, such as the spindle and feed screws.

<1.1. Calculation of Spindle Thermal Displacement State>

Figure 2:
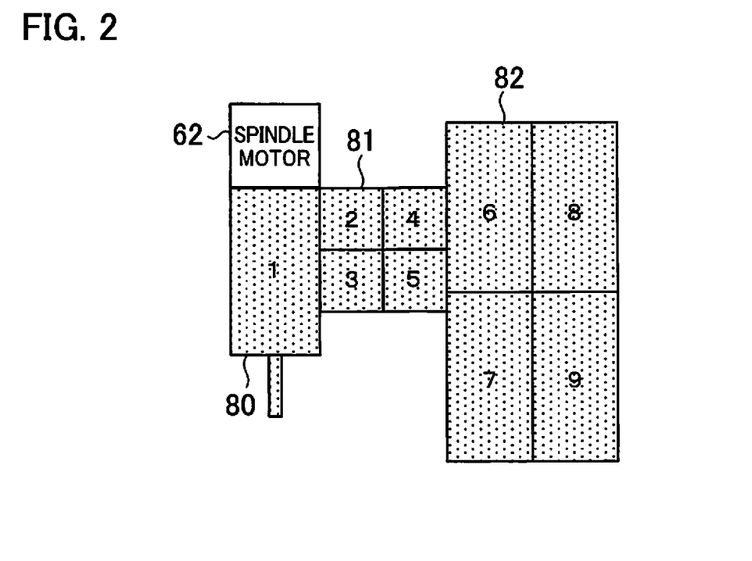
FIG. 2 is a diagram showing a two-dimensional model of a spindle.

As an example of a method for calculating the thermal displacement state of the spindle, there is a method in which the thermal displacement state of a spindle system is estimated from the drive state of the machine tool. As shown in FIG. 2, for example, a structure (spindle system) including a spindle 80, spindle mount 81, and column 82 is considered to be a planate two-dimensional model and divided into a plurality of sections (1 to 9). The temperatures of the individual sections are calculated according to calculation formulas that represent heat delivery. Since heat conduction occurs between each two adjacent sections, e.g., between Sections 1 and 2 or between Sections 2 and 3, such heat conduction is calculated for each predetermined period.

The friction of the spindle and the spindle motor are assumed to be heat sources, and heat from these heat sources applied to the adjacent sections is calculated. Since each section radiates heat into the atmosphere, moreover, heat removed from each section is also calculated. The temperature distribution of each section is estimated by combining these calculations.

Figure 3:
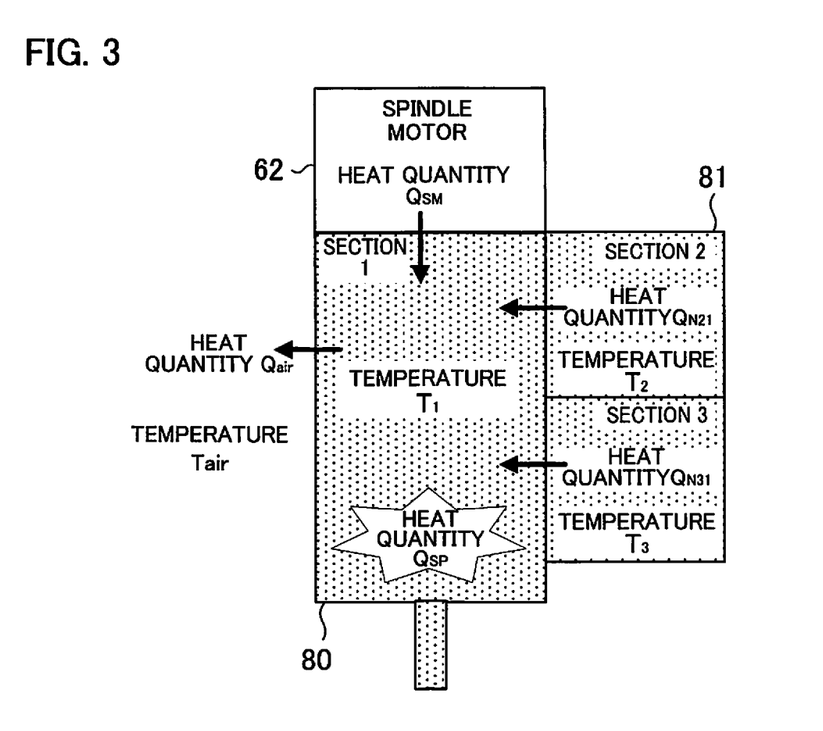
FIG. 3 is a schematic diagram showing the transfer of a heat quantity on the spindle.

FIG. 3 is a schematic diagram showing the transfer of a heat quantity Q in Section 1. Section 1 is in contact with the outside air, as well as with Sections 2 and 3. Further, the spindle motor and the frictional heat of the spindle itself serve as adjacent heat sources. In this case, a heat quantity $Q_1$ exchanged between Section 1 and the outside is given by expression (1) as follows:

$$Q_1 = Q_{21} + Q_{31} + Q_{SM} + Q_{SP} - Q_{air}, \quad (1)$$

where $Q_{21}$ and $Q_{31}$ are heat quantities exchanged between Section 1 and Sections 2 and 3, respectively, and $Q_{air}$ is a heat quantity exchanged between Section 1 and the outside air. Further, $Q_{SM}$ and $Q_{SP}$ are heat quantities given from the spindle motor and the spindle as the heat sources to Section 1.

The heat quantities $Q_{21}$ and $Q_{31}$ can be obtained based on temperature differences between the sections and are given by expression (2) as follows:

$$Q_{21} = k_{21} \cdot (T_2 - T_1),$$
$$Q_{31} = k_{31} \cdot (T_3 - T_1) \quad (2)$$

$T_1$, $T_2$ and $T_3$ of expression (2) are temperatures of Sections 1, 2 and 3, respectively. Further, $k_{21}$ and $k_{31}$ are coefficients of heat transfer between Sections 2 and 1 and between Sections 3 and 1, respectively, and are previously calculated by experiment or the like and loaded into a memory.

Furthermore, the heat quantity $Q_{air}$ can be obtained based on the difference between the temperature of Section 1 and the outside air temperature and is given by expression (3) as follows:

$$Q_{air} = f_1 \cdot (T_{air} - T_1). \quad (3)$$

Here $f_1$ of expression (3) is a function indicative of the state of heat dissipation to the outside air and is previously obtained in the form of a function or a table for each section by experiment or the like and loaded into the memory or the like.

For the heat quantities $Q_{SM}$ and $Q_{SP}$, moreover, relation between parameters such as the temperature of the winding of the spindle motor and number of revolutions of the spindle and the given heat quantities $Q_{SM}$ and $Q_{SP}$ are previously obtained in the form of a table by experiment or the like and loaded into the memory or the like.

A temperature change $\Delta T_1$ in Section 1 due to the heat exchange can be obtained by dividing the heat quantity $Q_1$ by a heat capacity $q_1$ for Section 1 according to expression (4) as follows:

$$\Delta T_1 = Q_1 / q_1. \quad (4)$$

Thus, a temperature $T_1$ of Section 1 can be obtained by calculating the temperature change $\Delta T_1$ in Section 1 for each predetermined period and adding the change $\Delta T_1$ to the temperature $T_1$ of Section 1 according to expression (5) as follows:

$$T_1 \leftarrow T_1 + \Delta T_1. \tag{5}$$

While the above expression is a calculation formula for the estimation of the temperature of Section 1 in the two-dimensional model of FIG. 2, temperatures $T_i$ of the individual sections can be estimated by creating similar calculation formulas for the other sections in consideration of the adjacent state of the sections in the two-dimensional model. The expansion and contraction of the sections are estimated based on the temperatures $T_i$ estimated in this manner, whereby the elongation and inclination of the spindle are calculated. The expansion and contraction of each section due to the temperature change can be estimated by, for example, previously measuring the amount of change of each of the sections due to the temperature change by experiment or the like and storing the change amounts in a table or the like or by calculation based on conventional thermal expansion simulation. The thermal displacement amounts and temperature distributions can be simultaneously estimated by using this method.

The method of division into the sections of FIG. 2 is given by way of example only and the estimation of the thermal displacement state of the spindle of the present invention is not limited to the aforementioned method.

Instead of estimating the thermal displacement state, moreover, measured values of the thermal displacement amounts and thermal displacement distributions may be obtained by means of a position sensor or measured values of temperature distributions may be obtained by means of a temperature sensor. Alternatively, these two methods may be combined so that a measured value of the thermal displacement state of a part is obtained and the thermal displacement state of the remaining part is estimated from the obtained value.

<1.2. Calculation of Feed Screw Thermal Displacement State>

Figure 4:
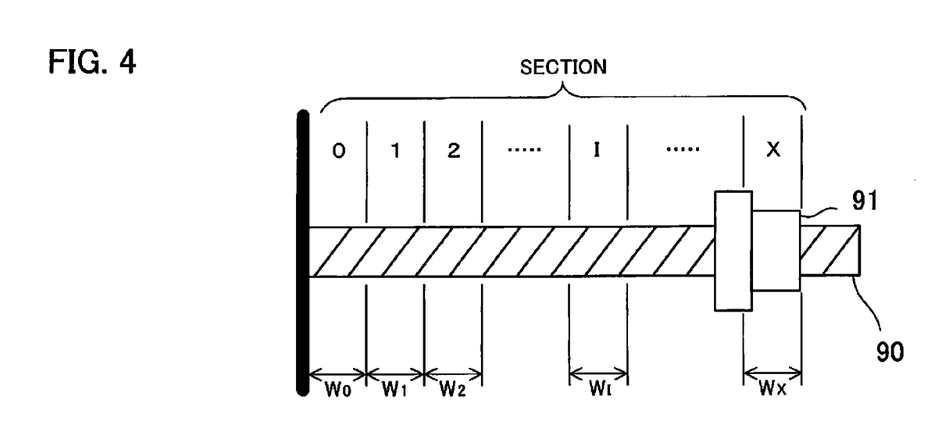
FIG. 4 is a diagram showing a one-dimensional model of a feed screw.

As an example of a method for calculating the thermal displacement state of the feed screws by the controller of the present invention, there is a method in which the thermal displacement state of the feed screws is estimated from the drive state of the machine tool. As shown in FIG. 4, for example, the entire stroke of a feed screw 90 is considered to be a one-dimensional model and divided into a plurality of sections (1 to X). The temperatures of the individual sections are calculated according to calculation formulas that represent heat delivery. Since heat conduction occurs between each two adjacent sections, e.g., between Sections I and (I−1) or between Sections I and (I+1), it is calculated for each predetermined period.

Frictional heat between the feed screw 90 and a ball nut 91 due to axial movement is assumed to be a heat source, and heat from the heat source applied to the adjacent sections is calculated. Since each section radiates heat into the atmosphere, moreover, heat removed from each section is also calculated. The temperature distribution of each section is estimated by combining these calculations.

Figure 5:
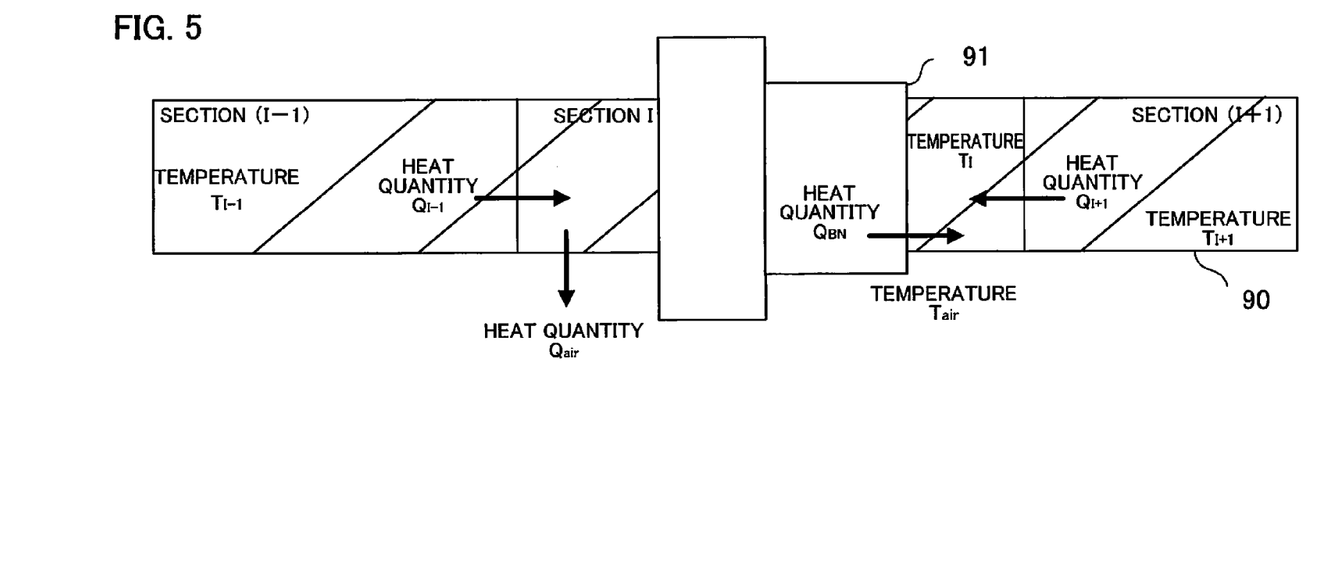
FIG. 5 is a schematic diagram showing the transfer of a heat quantity on the feed screw.

FIG. 5 is a schematic diagram showing the transfer of a heat quantity Q in Section 1. Section 1 is in contact with the outside air, as well as with Sections (I−1) and (I+1). Further, the heat of friction with the ball nut serves as an adjacent heat source. In this case, a heat quantity $Q_I$ exchanged between Section I and the outside is given by expression (6) as follows:

$$Q_I = Q_{I-1} + Q_{I+1} + Q_{BN} - Q_{air}, \tag{6}$$

where $Q_{I-1}$ and $Q_{I+1}$ are heat quantities exchanged between Section I and Sections (I−1) and (I+1), respectively, and $Q_{air}$ is a heat quantity exchanged between Section I and the outside air. Further, $Q_{BN}$ is a heat quantity given from the heat of friction with the ball nut to Section I. The heat quantities $Q_{I-1}$ and $Q_{I+1}$ can be obtained based on the temperature differences between the sections and are given by expression (7) as follows:

$$Q_{I-1} = k_I(T_{I-1} - T_I),$$

$$Q_{I+1} = k_I(T_{I+1} - T_I). \tag{7}$$

$T_I$, $T_{I-1}$ and $T_{I+1}$ of expression (7) are temperatures of Sections I, (I−1) and (I+1), respectively. Further, $k_I$ is a coefficient of heat transfer between Section I and Sections (I−1) and (I+1) and is previously calculated by experiment or the like and loaded into a memory. Furthermore, the heat quantity $Q_{air}$ can be obtained based on the difference between the temperature of Section I and the outside air temperature and is given by expression (8) as follows:

$$Q_{air} = g_I(T_{air} - T_I). \tag{8}$$

Here $g_I$ of expression (8) is a function indicative of the state of heat dissipation to the outside air and is previously obtained in the form of a function or a table for each section by experiment or the like and loaded into the memory or the like. For the heat quantity $Q_{BN}$, moreover, the relationship between the moving speed of the ball nut 91 and the heat quantity $Q_{BN}$ is previously obtained in the form of a table by experiment or the like and loaded into the memory or the like.

A temperature change $\Delta T_1$ in Section I due to the heat exchange expressed by expression (6) can be obtained by dividing the heat quantity $Q_I$ by a heat capacity $q_I$ for Section I according to expression (9) as follows:

$$\Delta T_I = Q_I/q_I. \tag{9}$$

Thus, a temperature $T_1$ of Section I can be obtained by calculating the temperature change $\Delta T_1$ in Section I for each predetermined period and adding the change $\Delta T_1$ to the temperature $T_1$ of Section I according to expression (10) as follows:

$$T_I \leftarrow T_I + \Delta T_1. \tag{10}$$

If the ball nut 91 is not in contact with Section I in a period to be calculated, the heat quantity $Q_{BN}$ as a term of expression (6) is treated as zero.

The expansion and contraction of each section are estimated based on the temperature $T_I$ estimated in this manner, whereby the elongation of the feed screws is calculated. A thermal displacement amount $\delta_{nI}$ for each section (Section 0 to Section X) is estimated from the estimated temperature $T_I$ according to expression (11) as follows:

$$\delta_{nI} = \alpha_I \cdot W_I(T_I - T_0). \tag{11}$$

In expression (11), $T_0$, $W_I$ and $\alpha_I$ are an initial temperature, length of Section I, and linear expansion coefficient, respectively. Further, a thermal displacement distribution $L_{nI}$ in each position of the feed screw is estimated according to expression (12) as follows:

$$L_{nI} = \delta_{n0} + \delta_{n1} + \ldots + \delta_{nI}. \tag{12}$$

The thermal displacement amounts and thermal displacement distributions can be simultaneously estimated by this method. In the present invention, the estimation of the thermal displacement state of the feed screw is not limited to the aforementioned method and can alternatively be achieved by a conventional method disclosed in, for example, Japanese Patent Application Laid-Open No. 2002-018677.

Instead of estimating the thermal displacement state, moreover, measured values of the thermal displacement amounts and thermal displacement distributions may be obtained by means of a position sensor or measured values of temperature distributions may be obtained by means of a temperature sensor. Alternatively, these two methods may be combined so that a measured value of the thermal displacement state of a part is obtained and the thermal displacement state of the remaining part is estimated from the obtained value.

<2. Entire Flow of Warm-Up Operation>

The following is a description of the entire flow of warm-up operation performed by the numerical controller 10 of FIG. 1.

Figure 6A:
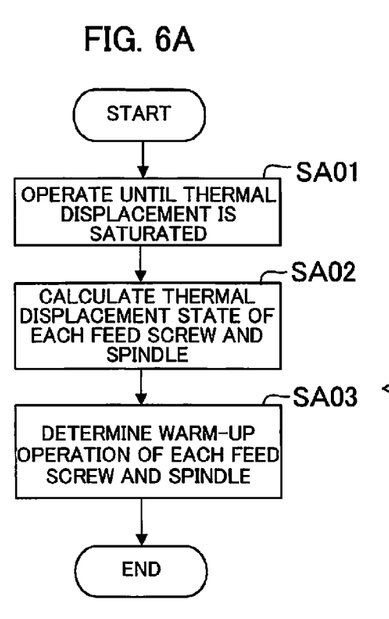
FIGS. 6A and 6B are flowcharts showing steps of processing of warm-up operation performed by the numerical controller of FIG. 1.
Figure 6B:
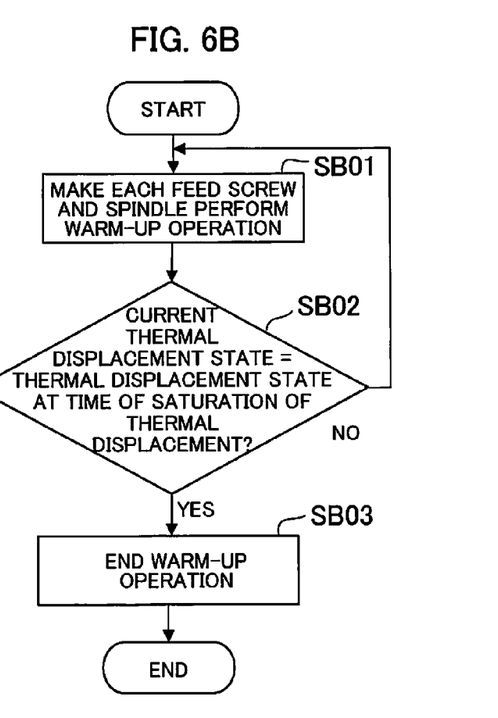

FIGS. 6A and 6B are flowcharts showing steps of processing of the warm-up operation. The flow of this warm-up operation comprises a process for previously performing regular operation and recording necessary data (FIG. 6A) and a process for actually performing efficient warm-up operation based on the recorded data (FIG. 6B).

In the process shown in the flowchart of FIG. 6A, the machine tool is operated to a point in time when the thermal displacement is saturated and the thermal displacement state based on the saturated thermal displacement is recorded on a memory or the like. This process need not always be performed every day before the start of the operation and should only be first performed once unless the machining programs or machining intervals are changed.

[Step SA01] The same operation as actual workpiece machining operation is performed until the thermal displacement of the machine tool is saturated. Whether or not the thermal displacement of the machine tool is saturated should only be determined by measuring the displacements of each feed screw and the spindle for each predetermined period during the same operation as the actual workpiece machining operation. In this case, it can be determined that the thermal displacement is saturated when the displacement is stabilized.

[Step SA02] The thermal displacement state of each feed screw and the spindle is calculated based on the drive state of the machine tool when the thermal displacement of the machine tool is saturated. In the present embodiment, the thermal displacement state is calculated by, for example, the method described in "<1. Calculation of Thermal Displacement State>".

[Step SA03] The thermal displacement state calculated in Step SA02 is stored in the memory and warm-up operation patterns for each feed screw and the spindle is determined. A method for determining the warm-up operation pattern will be described later.

In the process shown in the flowchart of FIG. 6B, warm-up control is performed according to the determined warm-up operation pattern, based on the thermal displacement state stored in the memory in Step SA03 in the flowchart of FIG. 6A. This process is performed before the start of daily operation.

[Step SB01] The warm-up control is repeated according to the warm-up operation pattern determined in the processing of Step SA03 in the flowchart of FIG. 6A.

[Step SB02] The current thermal displacement state of each feed screw and the spindle calculated during the warm-up operation is compared with the thermal displacement state of each feed screw and the spindle at the point in time when the thermal displacement is saturated, which is stored in Step SA03. If the comparison indicates that the difference between the current thermal displacement state and the thermal displacement state at the point in time when the thermal displacement of the machine tool is saturated is larger than a predetermined threshold value, the processing proceeds to Step SB01. If the difference is not larger than the predetermined threshold value, in contrast, the processing proceeds to Step SB03.

[Step SB03] The warm-up operation ends.

<3. Method for Determining Warm-Up Operation Pattern>

The following is a description of a method for determining a warm-up operation pattern performed by the numerical controller 10 of FIG. 1.

In this determination of the warm-up operation pattern, a warm-up program is used in place of the machining programs that are used for the actual workpiece machining operation. The warm-up operation pattern for each feed screw and the spindle is described in the warm-up program, and each feed screw and the spindle can be individually activated and stopped by changing the parameters.

<3.1. Determination of Warm-Up Operation Pattern for Spindle>

In determining the warm-up operation pattern that reproduces a situation in which thermal displacement of a spindle is saturated, it is desirable to reproduce the temperature distribution of the entire spindle system, as well as the partial temperature of the spindle. This is because deformations of the spindle mount and the column vary depending on the temperature distribution of the spindle system and the thermal displacement amount due to the inclination of the spindle changes.

In general, the spindle warms more easily at high rotation than at lower. If the spindle is continuously rotated, the spindle motor and the spindle are gradually increased in temperature, providing a gentle temperature distribution such that the temperature is high in the sections near the spindle and lower in the sections distant from the spindle. If the spindle is intermittently rotated, that is, repeatedly rotated and stopped, the spindle motor easily gets warm, in particular. If the spindle motor suddenly warms, the temperatures of the adjacent sections drastically increase, so that a sharp temperature distribution is provided. The warm-up operation pattern is determined so that these gentle and sharp temperature distributions can be reproduced by the warm-up operation.

Figure 7:
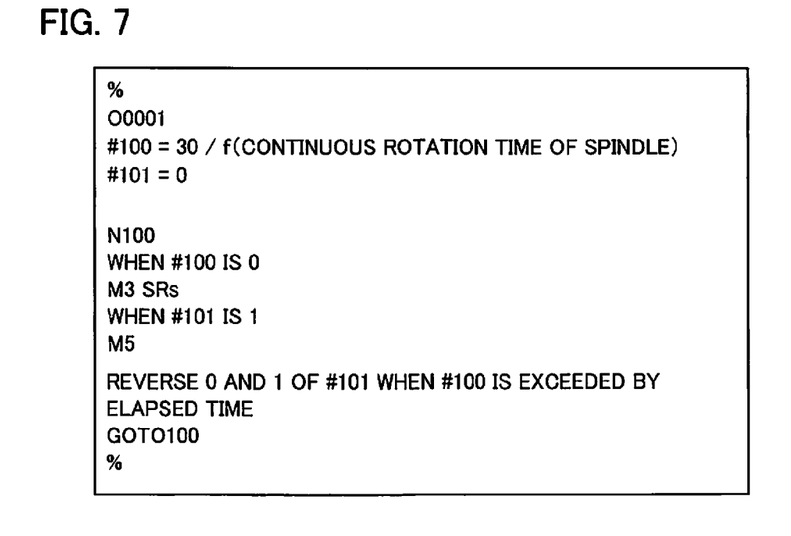
FIG. 7 is a diagram showing an example of a warm-up program for the spindle performed by the numerical controller of FIG. 1.

The warm-up operation pattern according to the present embodiment is based on a spindle rotating speed $R_S$ and a frequency f as parameters. The spindle repeats rotation and stop at the frequency f and is commanded with the spindle rotating speed $R_S$ when it is rotated. Such a program as shown in FIG. 7 is used, for example. The frequency f is assumed to be the number of times of acceleration and deceleration within one minute.

Figure 8:
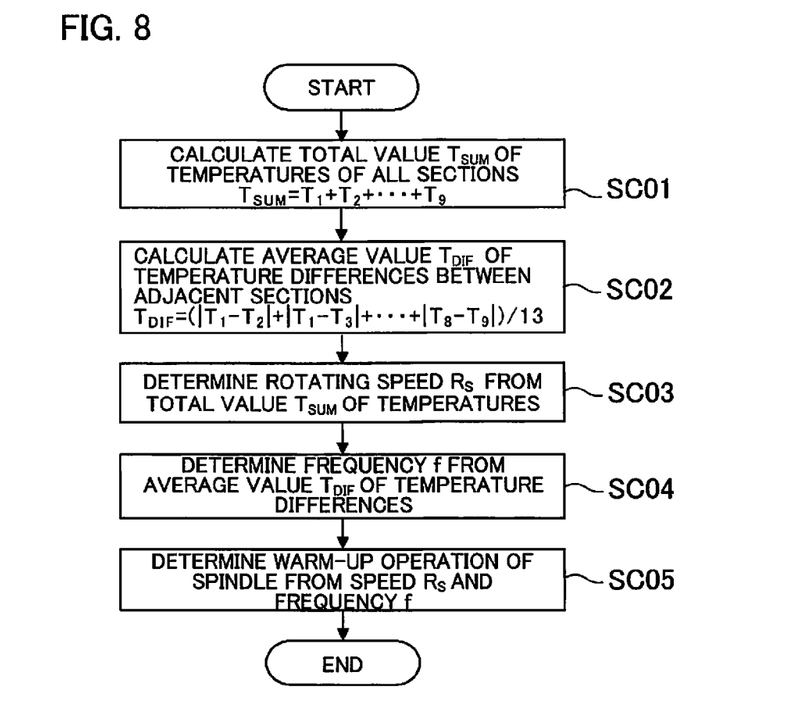
FIG. 8 is a flowchart of processing for determining a warm-up operation pattern for the spindle performed by the numerical controller of FIG. 1.

The warm-up operation pattern is determined based on the processing as shown in the flowchart of FIG. 8. Description is given below in line with the steps of the flowchart.

Before performing this processing, the relationship of a total value $T_{SUM}$ of temperatures and an average value $T_{DIF}$ of temperature differences and the spindle rotating speed $R_S$ and the spindle frequency f is previously measured by experiment or the like. A table in which these values are associated with one another is previously stored as a database in a memory such as the SRAM 14 of the numerical controller. Based on this table, the spindle rotating speed $R_S$ and the spindle frequency f are obtained in Steps SC03 and SC04. In the experiment, the total value $T_{SUM}$ of the temperatures and the average value $T_{DIF}$ of the temperature differences are recorded at the point in time when the thermal displacement is saturated with the spindle being intermittently rotated at the spindle rotating speed $R_S$ and the spindle frequency f, for example.

[Step SC01] The total value $T_{SUM}$ of the temperatures of all the sections of the spindle system at the time of saturation of the thermal displacement is calculated. If $T_I$ is the temperature of Section I, the total value $T_{SUM}$ of the temperatures, in the two-dimensional model of FIG. 2, is given by expression (13) as follows:

$$T_{SUM} = T_1 + T_2 + \ldots + T_9. \tag{13}$$

[Step SC02] The average value $T_{DIF}$ of the temperature differences between the adjacent sections of the spindle system at the time of saturation of the thermal displacement is calculated. In the two-dimensional model of FIG. 2, the average value $T_{DIF}$ of the temperature differences is given by expression (14) as follows:

$$T_{DIF} = (|T_1 - T_2| + |T_1 - T_3| + \ldots + |T_8 - T_9|)/13. \tag{14}$$

[Step SC03] Based on data on the spindle rotating speed and the total value $T_{SUM}$ of the temperatures, the spindle rotating speed $R_S$ corresponding to the total value $T_{SUM}$ of the temperatures is determined. If the total value $T_{SUM}$ of the temperatures is large, the determined spindle rotating speed $R_S$ is high. If the total value $T_{SUM}$ of the temperatures is small, the determined spindle rotating speed $R_S$ is low.

[Step SC04] Based on data on the spindle rotating speed and the average value $T_{DIF}$ of the temperature differences, for the spindle rotating speed $R_S$ determined in Step SC03, the spindle frequency f corresponding to the average value $T_{DIF}$ of the temperature differences is determined. If the average value $T_{DIF}$ of the temperature differences is large, the determined frequency f is short. If the average value $T_{DIF}$ of the temperature differences is small, the determined frequency f is long.

[Step SC05] The warm-up operation pattern for the spindle is determined from the spindle rotating speed $R_S$ and the spindle frequency f, and the warm-up program based on the determined warm-up operation pattern is created.

<3.2. Determination of Warm-Up Operation Pattern for Feed Screw>

In determining the warm-up operation pattern that reproduces situation in which thermal displacement is saturated, it is desirable to reproduce a range in which heat is produced by the actual workpiece machining operation, as well as to equalize the thermal displacement amount of the entire feed screw. This is because the feed screw is not uniformly heated, in general, and its parts exposed to the movement of the ball nut are locally heated, so that the thermal displacement is large in some parts and small in others.

In general, the feed screw warms more easily when it is rotated at a high speed that produces higher friction than at a lower speed. That part of the feed screw in contact with the ball nut generates heat, which propagates to the ends of the feed screw with time. The warm-up operation pattern is determined by the warm-up operation so that the thermal displacement distributions can be reproduced.

Figure 9:
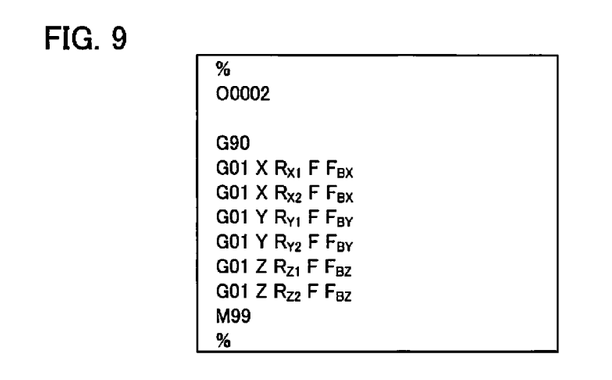
FIG. 9 is a diagram showing an example of a warm-up program for the feed screw performed by the numerical controller of FIG. 1.

In the warm-up operation pattern performed by the numerical controller 10 of FIG. 1, turning points $R_1$ and $R_2$ and a feed rate $F_B$ are used as parameters. The table of the machine tool is reciprocated between the turning points $R_1$ and $R_2$. Such a program as shown in FIG. 9 is used, for example. Here $F_{BX}$ represents an X-axis feed rate. $R_{X1}$ and $R_{X2}$ represent turning points. $F_{BY}$ represents a Y-axis feed rate. $R_{Y1}$ and $R_{Y2}$ represent turning points. $F_{BZ}$ represents a Z-axis feed rate. And $R_{Z1}$ and $R_{Z2}$ represent turning points.

Figure 10:
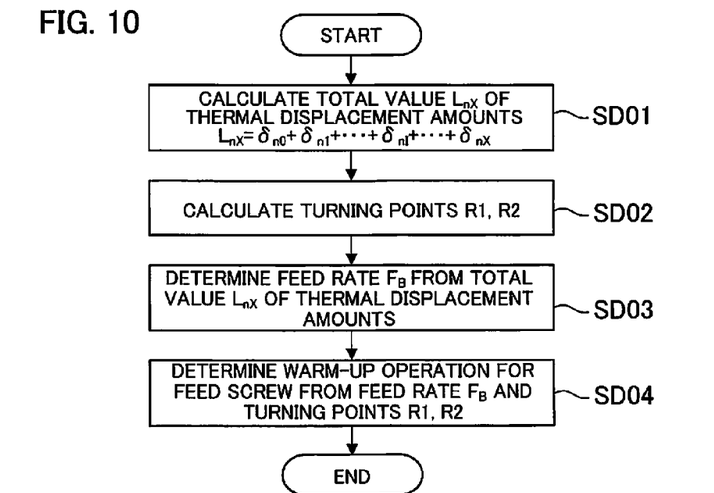
FIG. 10 is a flowchart of processing for determining a warm-up operation pattern for the feed screw performed by the numerical controller of FIG. 1.

The warm-up operation pattern is determined with reference to the flowchart of FIG. 10. Description is given below in line with the steps of the flowchart.

Before performing this processing, the relationship between the feed rate and a total value $L_{nX}$ of thermal displacement amounts described in Step SD01 is previously measured by experiment or the like. A table in which these values are associated with one another is previously loaded as a database into a memory such as the SRAM 14 of the numerical controller. Based on this table, the feed rate $F_B$ is obtained from the total value $L_{nX}$ of the thermal displacement amounts in Step SD03 described later. The total value $L_{nX}$ of the thermal displacement amounts is recorded at the point in time when the thermal displacement is saturated as the table of the machine tool is reciprocated at the feed rate $F_B$, for example. Further, an offset amount α, which is determined depending on the thermal conductivity characteristics of the feed screw, is also determined in advance.

[Step SD01] The total value $L_{nX}$ of the thermal displacement amounts is calculated according to expression (15) as follows:

$$L_{nX} = \delta_{n0} + \delta_{n1} + \ldots + \delta_{nI} + \ldots + \delta_{nX}. \tag{15}$$

Figure 11:
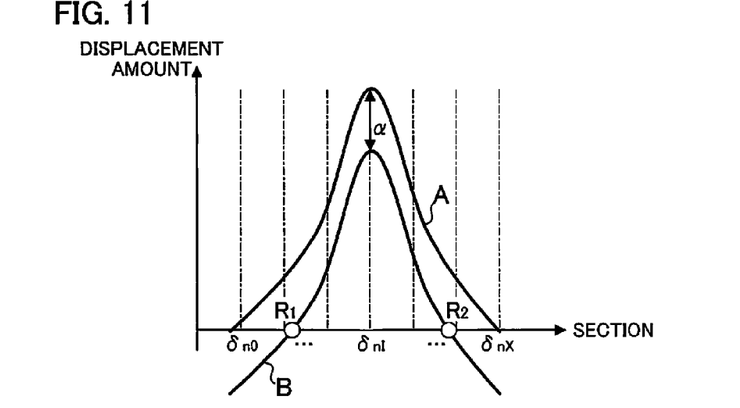
FIG. 11 is a diagram illustrating a method for calculating turning points in the warm-up operation pattern for the feed screw performed by the numerical controller of FIG. 1.

[Step SD02] The turning points $R_1$ and $R_2$ are calculated. Processing for the calculation of the turning points $R_1$ and $R_2$ will be described with reference to FIG. 11. First, the thermal displacement amounts $\delta_{nI}$ for the adjacent sections of the feed screw are connected and graphically represented, as shown in graph A of FIG. 11. The range of intersection of this graph and the X-axis (abscissa representing the sections) represents a range in which the feed screw generates heat. Then, as shown in graph B of FIG. 11, graph A is offset in such a direction that the displacement amount is reduced by the preset offset amount α. Further, the points of intersection of graph B and the X-axis or the ends of the feed screw are calculated as the turning points $R_1$ and $R_2$. On account of heat conduction, the feed screw causes thermal displacement in a range wider than the range of movement of the ball nut. Therefore, the turning points $R_1$ and $R_2$ are assumed to correspond to a range made narrower than graph A by the offset amount α. Depending on the machining programs, there may be two or more turning points. In such a case, a thermal displacement distribution is represented by creating such a warm-up operation pattern that the range of reciprocation is periodically changed.

[Step SD03] The feed rate $F_B$ corresponding to the total value $L_{nX}$ of the thermal displacement amounts is determined based on data on the feed rate and the total value $L_{nX}$ of the thermal displacement amounts. If the total value $L_{nX}$ of the thermal displacement amounts is large, the determined feed rate $F_B$ is high. If the total value $L_{nX}$ of the thermal displacement amounts is small, the determined feed rate $F_B$ is low.

[Step SD04] The warm-up operation pattern for the feed screw is determined from the turning points $R_1$ and $R_2$ and the feed rate $F_{BI}$ and the warm-up program based on the determined warm-up operation pattern is created.

In order to reduce the influence of ambient temperature change and the like, the warm-up operation pattern may be switched in real time based on the result of calculation of the temperature and thermal displacement amount during the warm-up operation.

<4. Determination of Termination of Warm-Up Operation>

The following is a description of means for determining termination of warm-up operation.

<4.1. Determination of Termination of Warm-Up Operation of Spindle>

The warm-up operation is performed as the thermal displacement state of the spindle is calculated for each predetermined period. The temperatures of the individual sections calculated in Step SA02 are compared with the current temperature. If the differences for all the sections are not larger than a predetermined threshold value, the warm-up of the spindle is stopped by changing the parameters.

<4.2. Determination of Termination of Warm-Up Operation of Feed Screw>

The warm-up operation is performed as the thermal displacement state of each feed screw is calculated for each predetermined period. The thermal displacement amounts calculated in Step SA02 are compared with the current thermal displacement amounts $\delta_{nI}$ for all Sections 0 to X. If the comparison indicates the difference for any of the sections is not larger than a predetermined threshold value, the warm-up operation of the feed screw concerned is stopped by changing the parameters.

The invention claimed is:

1. A controller for a machine tool, the controller being configured to drive at least one motor based on a machining program to drive a spindle and a feed screw of the machine tool, the controller comprising:
a memory that stores, as target thermal displacement states of the spindle and the feed screw, thermal displacement states of the spindle and the feed screw when operated by respective warm-up operations such that thermal displacements of the spindle and the feed screw are saturated, wherein a thermal displacement state indicates at least one of thermal displacement amounts, thermal displacement distributions, and temperature distributions, and wherein a thermal displacement is determined to be saturated when displacement is stabilized; and
a processor configured to:
calculate the thermal displacement states for the spindle and the feed screw, wherein the thermal displacement state of the spindle is calculated by dividing the spindle into a plurality of sections, calculating temperatures of the plurality of sections of the spindle, and calculating heat conduction between adjacent sections of the spindle, and wherein the thermal displacement of the feed screw is calculated by dividing the feed screw into a plurality of sections, calculating temperatures of the plurality of sections of the feed screw, and calculating heat conduction between adjacent sections of the feed screw;
determine a warm-up operation pattern of the spindle and a warm-up pattern of the feed screw on the basis of the thermal displacement states calculated for the spindle and the feed screw, wherein, when the thermal displacement of the machine tool is saturated, the warm-up operation pattern of the spindle is determined from a rotating speed of the spindle obtained based on a total value of the temperatures of the plurality of sections of the spindle, and from a frequency of acceleration and deceleration of the spindle obtained based on an average value of temperature differences between adjacent sections of the spindle,
and the warm-up operation pattern of the feed screw is determined from a feed rate obtained based on a total value of thermal displacement amounts of the plurality of sections of the feed screw, and from turning points obtained based on the thermal displacement amounts of the plurality of sections of the feed screw;
drive the at least one motor according to the warm-up operation patterns determined for the spindle and the feed screw, wherein the spindle and the feed screw are driven to perform the respective warm-up operations up to a warm-up operation termination; and
determine the warm-up operation termination by calculating a current thermal displacement state of the spindle and a current thermal displacement state of the feed screw, comparing the calculated respective current thermal displacement states of the spindle and the feed screw with the stored respective target thermal displacement states of the spindle and the feed screw, and respectively stopping the at least one motor driving the spindle or the feed screw in response to a respective difference between the calculated respective current thermal displacement state and the stored respective target thermal displacement state of the spindle or the feed screw being not larger than a respective predetermined threshold value, to terminate the respective warm-up operation of the spindle or the feed screw.

2. The controller according to claim 1, wherein the processor is configured to calculate the thermal displacement states of the spindle and the feed screw even after the at least one motor is stopped, and resume driving the motor by the at least one motor in response to a determination that the calculated thermal displacement states do not conform with the respective target thermal displacement states.

3. The controller according to claim 1, further comprising:
a position sensor configured to measure actual thermal displacement amounts for the plurality of sections obtained by dividing the feed screw; and a temperature sensor configured to measure actual temperatures of the plurality of sections of the feed screw, wherein the processor is configured to obtain a value of the thermal displacement state of one part of the plurality of sections of the feed screw from the position sensor, and estimate the thermal displacement state of the other part of the plurality of sections of the feed screw from the obtained value.

4. The controller according to claim 1, wherein a relationship between a moving speed of the machine tool and a heat quantity on the feed screw is previously obtained and stored into the memory in the form of a table.

* * * * *